United States Patent
Kalhan et al.

(10) Patent No.: US 10,165,585 B2
(45) Date of Patent: Dec. 25, 2018

(54) PHYSICAL CHANNEL STRUCTURE FOR COMMUNICATION IN UNLICENSED FREQUENCY BAND

(71) Applicant: Kyocera Corporation, Kyoto (JP)

(72) Inventors: Amit Kalhan, San Diego, CA (US); Henry Chang, San Diego, CA (US); David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 94 days.

(21) Appl. No.: 15/311,799

(22) PCT Filed: May 22, 2015

(86) PCT No.: PCT/US2015/032279
§ 371 (c)(1),
(2) Date: Nov. 16, 2016

(87) PCT Pub. No.: WO2015/179826
PCT Pub. Date: Nov. 26, 2015

(65) Prior Publication Data
US 2017/0118748 A1  Apr. 27, 2017

Related U.S. Application Data

(60) Provisional application No. 62/002,041, filed on May 22, 2014, provisional application No. 62/002,037, filed on May 22, 2014.

(51) Int. Cl.
*H04W 72/04* (2009.01)
*H04W 72/12* (2009.01)
(Continued)

(52) U.S. Cl.
CPC ...... *H04W 72/1215* (2013.01); *H04B 7/2615* (2013.01); *H04L 5/001* (2013.01);
(Continued)

(58) Field of Classification Search
CPC ... H04L 5/0048; H04L 27/0006; H04L 5/001; H04W 72/1215; H04W 72/082;
(Continued)

(56) References Cited

U.S. PATENT DOCUMENTS

2008/0298450 A1  12/2008  Zhang et al.
2010/0029216 A1   2/2010  Jovicic et al.
(Continued)

FOREIGN PATENT DOCUMENTS

| EP | 3226638 A1 | 10/2017 |
|---|---|---|
| WO | WO 2013-155672 | 10/2013 |
| WO | WO 2013-179095 | 12/2013 |

OTHER PUBLICATIONS

NTT Docomo; "On the need for additional carrier types in Rel-11 CA"; R1-112428; 3GPP TSG RAN WG1 Meeting #66; Aug. 16, 2011; Athens, GR.
(Continued)

*Primary Examiner* — Mewale A Ambaye

(57) ABSTRACT

Communication equipment communicates in a licensed frequency band using a licensed band physical channel structure (licensed structure) and communicates in an unlicensed frequency communication band using an unlicensed band physical channel structure (unlicensed structure) where the unlicensed structure includes at least the same symbol times and subcarrier frequency divisions as in the licensed structure. The symbol times and subcarriers form a plurality of time-frequency communication resource elements. A set of symbol times and subcarrier frequency divisions form a licensed reference subset of communication resource elements that are allocated for reference signal transmission in the licensed structure. The same set of symbol times and subcarrier frequency divisions form an unlicensed reference subset of communication resource elements that are allo-
(Continued)

cated for reference signal transmission in the unlicensed structure.

21 Claims, 12 Drawing Sheets

(51) Int. Cl.

| | | |
|---|---|---|
| H04W 76/14 | (2018.01) | |
| H04W 4/70 | (2018.01) | |
| H04W 16/14 | (2009.01) | |
| H04W 24/10 | (2009.01) | |
| H04W 72/08 | (2009.01) | |
| H04W 24/08 | (2009.01) | |
| H04W 72/02 | (2009.01) | |
| H04L 5/00 | (2006.01) | |
| H04L 27/00 | (2006.01) | |
| H04W 74/08 | (2009.01) | |
| H04W 84/12 | (2009.01) | |
| H04B 7/26 | (2006.01) | |
| H04W 88/06 | (2009.01) | |
| H04W 88/08 | (2009.01) | |

(52) U.S. Cl.
CPC ........... *H04L 27/0006* (2013.01); *H04W 4/70* (2018.02); *H04W 16/14* (2013.01); *H04W 24/08* (2013.01); *H04W 24/10* (2013.01); *H04W 72/02* (2013.01); *H04W 72/042* (2013.01); *H04W 72/0413* (2013.01); *H04W 72/0446* (2013.01); *H04W 72/0453* (2013.01); *H04W 72/082* (2013.01); *H04W 72/1284* (2013.01); *H04W 74/0808* (2013.01); *H04W 76/14* (2018.02); *H04W 84/12* (2013.01); *H04L 5/0048* (2013.01); *H04W 74/0866* (2013.01); *H04W 88/06* (2013.01); *H04W 88/08* (2013.01)

(58) Field of Classification Search
CPC ..... H04W 72/02; H04W 84/12; H04W 88/06; H04W 16/14; H04W 24/08; H04W 76/14
See application file for complete search history.

(56) References Cited

U.S. PATENT DOCUMENTS

| | | |
|---|---|---|
| 2010/0246506 A1 | 9/2010 | Krishnaswamy et al. |
| 2011/0312331 A1 | 12/2011 | Hakola et al. |
| 2012/0307869 A1 | 12/2012 | Charbit et al. |
| 2013/0083783 A1 | 4/2013 | Gupta et al. |
| 2013/0143502 A1 | 6/2013 | Kazmi et al. |
| 2014/0024386 A1* | 1/2014 | Novak ................ H04W 72/082 455/452.1 |
| 2014/0036818 A1 | 2/2014 | Koskela et al. |
| 2014/0036853 A1 | 2/2014 | Kim et al. |
| 2014/0112289 A1 | 4/2014 | Kim et al. |

OTHER PUBLICATIONS

Cisco; "On LTE in Unlicensed Spectrum"; RP-131749; 3GPP TSG RAN Meeting #62; Nov. 26, 2013; Busan, KR.
Huawei, Ericsson, Qualcomm, CMCC, Verizon; "Summary of a workshop on LTE in Unlicensed Spectrum"; RP-140060; 3GPP TSG RAN Meeting #63; Feb. 25, 2014; Fukuoka, JP.
Huawei, CMCC, Ericsson, Qualcomm, Verizon; "Motivation of the New SI Proposal: Study on Licensed-Assisted Access using LTE"; RP-140214; 3GPP TSG RAN Meeting #63; Feb. 25, 2014; Fukuoka, JP.
Ericsson, Qualcomm, Huawei; "Study on Licensed-Assisted Access Using LTE"; RP-140260; 3GPP TSG RAN Meeting #63; Feb. 25, 2014; Fukuoka, JP.
Motorola; "Relay UL/DL timing discussion," R1-01119; 3GPP TSG RAN WG1 Meeting #60; San Francisco, CA Sep. 22-26, 2017.
Feilu Liu, Elza Erkip, Mihaela C. Beluri, Rui Yang, and Erdem Bala; "Dual-Band Femtocell Traffic Balacing Over Licensed and Unlicensed Bands,"; International Workshop on Small Cell Wireless Networks 2012; IEEE ICC 2012; Ottawa, CA.
Samsung; "Physical Channel Design for Scheduling Assignment"; R1-141851; 3GPP TSG RAN WG1 Meeting #76bis; Mar. 31-Apr. 4, 2014; Shenzhen, China.
Kyocera, "Design Details of Scheduling Assignments"; R1-141459; 3GPP TSG RAN WG1 Meeting #76bis; Mar. 31-Apr. 4, 2014; Shenzhen, China.

\* cited by examiner

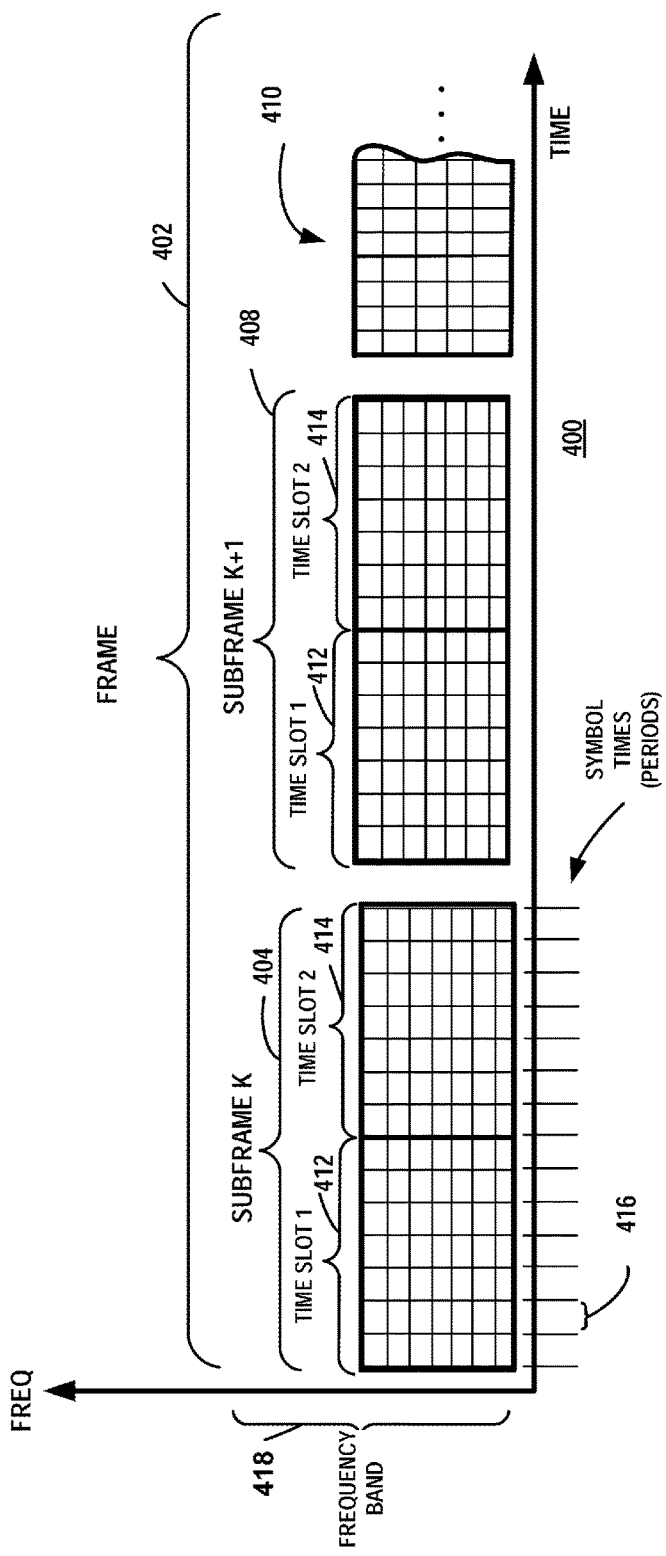

PHYSICAL CHANNEL STRUCTURE FOR COMMUNICATION IN UNLICENSED FREQUENCY BAND

CLAIM OF PRIORITY

The present application claims priority to Provisional Application No. 62/002,037, entitled "METHODS OF RESERVING RESOURCES ON UNLICENSED BANDS", filed May 22, 2014, and to Provisional Application No. 62/002,041, entitled "METHODS OF COORDINATING LTE TRANSMISSIONS ON UNLICENSED BANDS", filed May 22, 2014, both assigned to the assignee hereof, and hereby expressly incorporated by reference.

RELATED PATENT APPLICATIONS

The present application claims is related to PCT Patent Application entitled "UNLICENSED FREQUENCY BAND WITH LICENSED FREQUENCY BAND TIMING", PCT Patent Application entitled "COMMUNICATION RESOURCE SCHEDULING FOR DEVICE-TO-DEVICE (D2D) COMMUNICATION IN AN UNLICENSED FREQUENCY BAND", and PCT Patent Application entitled "ASSIGNMENT OF COMMUNICATION RESOURCES IN AN UNLICENSED FREQUENCY BAND TO EQUIPMENT OPERATING IN A LICENSED FREQUENCY BAND", all filed concurrently with this application, assigned to the assignee hereof, and hereby expressly incorporated by reference.

FIELD

This invention generally relates to wireless communications and more particularly to physical channel structure for communication in an unlicensed frequency band using licensed frequency band timing.

BACKGROUND

Many communication systems employ timing structures for managing communications between devices. Time can be defined in any number of units and subunits where the communication equipment applies the timing to transmission and reception. For example, some systems divide time into at least frames, subframes, timeslots, and symbol times to form the physical channel timing structure. A physical channel structure may also involve dividing and organizing the available frequency bandwidth. As a result, a defined physical channel structure typically includes dividing the frequency and time resources into units and subunits to allow efficient management and use of time-frequency communication resource.

The frequency spectrum used by a particular communication system may be licensed or unlicensed. Licensed frequency spectrum (frequency band) is licensed to a system operator by a government agency such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of unlicensed frequency spectrum includes frequency bands used for Institute of Electrical and Electronics Engineers (IEEE) 802.11 communication.

SUMMARY

Communication equipment communicates in a licensed frequency band using a licensed band physical channel structure (licensed structure) and communicates in an unlicensed frequency communication band using an unlicensed band physical channel structure (unlicensed structure) where the unlicensed structure includes at least the same symbol times and subcarrier frequency divisions as in the licensed structure. The symbol times and subcarriers form a plurality of time-frequency communication resource elements. A set of symbol times and subcarrier frequency divisions form a licensed reference subset of communication resource elements that are allocated for reference signal transmission in the licensed structure. The same set of symbol times and subcarrier frequency divisions form an unlicensed reference subset of communication resource elements that are allocated for reference signal transmission in the unlicensed structure.

BRIEF DESCRIPTION OF THE DRAWINGS

FIG. 4 is an illustration of a timing structure that includes at least frames, subframes, timeslots, and symbol times (periods).

DETAILED DESCRIPTION

Figure 1A:
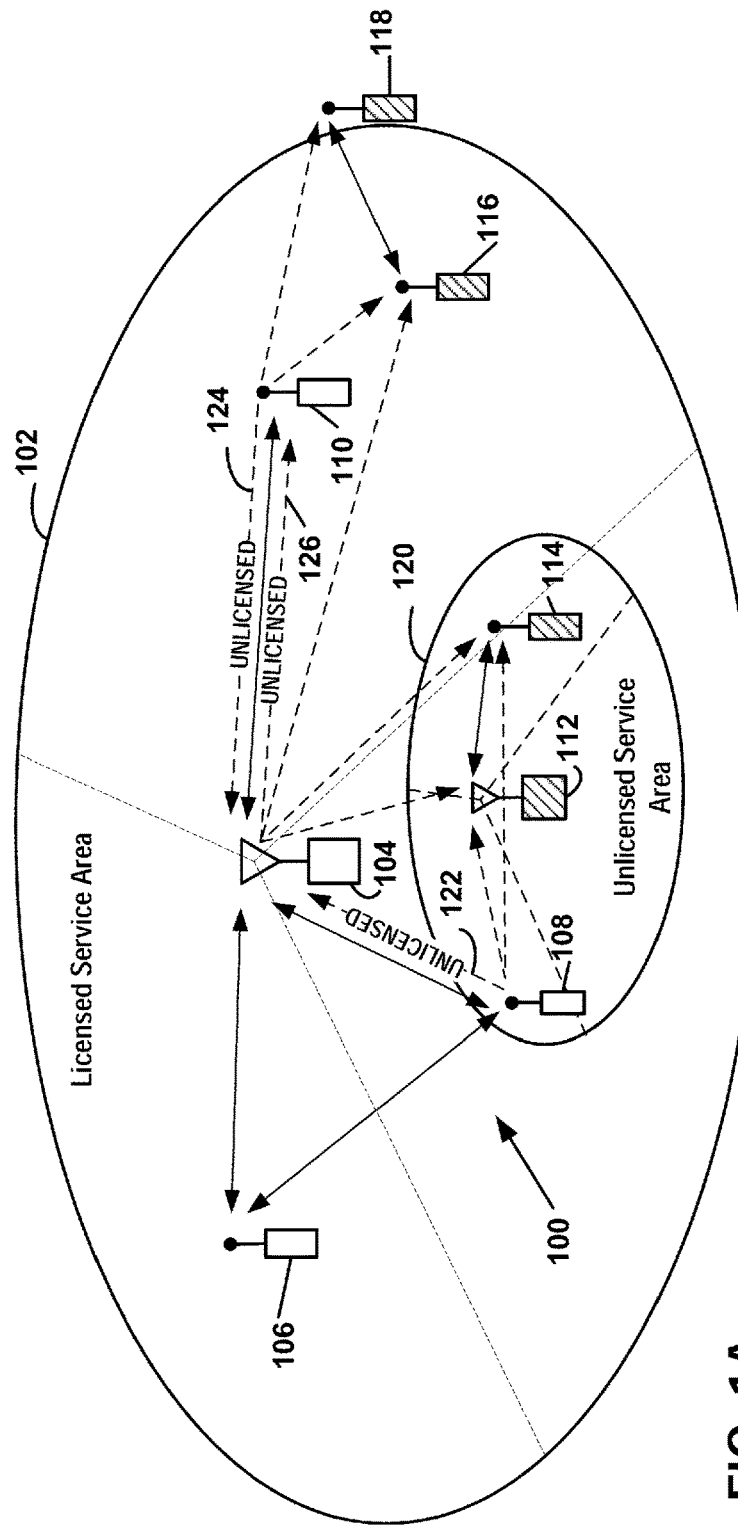
FIG. 1 is a block diagram of a licensed communication system having a licensed service area where communication equipment communicates using an unlicensed frequency band.

At least some features of physical channel structure used for communication by communication equipment in a licensed frequency band are used by the communication equipment to communicate using an unlicensed frequency spectrum. As discussed herein, "timing structure" and "timing scheme" refer to the divisions and subdivisions in time for managing communication. The "frequency structure" refers to the frequency divisions and arrangement of the channel. The "physical channel structure" refers to the frequency structure as applied to the timing structure to define the channel structure. The time-frequency communication resource of a physical channel, therefore, is divided and organized by the physical channel structure. The physical channel structure divides the frequency resource and the time resource to form a plurality of time-frequency communication resources that are sometimes referred to as communication resource elements. The time-frequency communication resources (resource elements) are allocated for different types of information in the physical channel structure. For example, one set of resources is allocated for data, another set is allocated for control information, and a third is allocated for reference signals. The specific resources by equipment at any given time are typically a subset of the allocated set of resources. A scheduler, for example, schedules less than all of the allocated data resource elements for data transmission from a particular UE device.

For the examples herein, the timing and the timing structure used for communication by communication equipment in a licensed frequency band are used by the communication equipment to communicate using the unlicensed frequency spectrum. The licensed frequency structure is applied to the unlicensed frequency band such that the number of frequency divisions and subdivisions of the licensed frequency structure are used in the unlicensed frequency structure although the frequencies are different. At least some of the sets of time-frequency resources allocated in the licensed physical channel structure are used in the unlicensed physical channel structure. The timing structure in the examples below includes dividing time into at least frames, subframes and timeslots and symbol times. As discussed herein "timing" refers to points in time and periods of time. More specifically, using the same timing requires that the boundaries of the smallest division of time in the timing structure be aligned. By applying the timing of the licensed system to the unlicensed frequency band, therefore, communication events are aligned in time. Although the timing structure used in the unlicensed frequency band can be applied such that it is aligned with the timing structure in the licensed frequency, the timing of the licensed system can be applied to communication in the unlicensed frequency band without aligning the timing structure. For example, the timing structure used in the unlicensed frequency band may be offset from the timing structure in the licensed frequency band by some multiple of symbol times. Since the timing used in the licensed frequency band is applied to the unlicensed frequency band, however, the boundaries of the symbol times in the unlicensed frequency band are aligned with the symbol time boundaries in the licensed frequency band.

A set of resources in the unlicensed physical channel structure that corresponds to a set of resources in the licensed physical channel structure occupies the same symbol times (periods) in the unlicensed structure as in the licensed structure. In some examples discussed below, the unlicensed physical channel structure includes sets of resources used in an uplink licensed physical channel structure and the transmitting device is a user equipment (UE) device. In other examples, the unlicensed physical channel structure includes sets of resources used in a downlink licensed physical channel structure and the transmitting device is an eNB.

FIG. 1 is a block diagram of a licensed communication system 100 having a licensed service area 102 where communication equipment 104, 106, 108, 110 communicates using an unlicensed frequency band. The licensed communication system 100 may be any communication system that uses a portion of frequency spectrum (frequency band) that is licensed to the system operator by a government agency such as the Federal Communications Commission (FCC). For the examples discussed herein, the licensed communication system 100 is a cellular system that operates in accordance with at least one revision of The Third-Generation Partnership Project Long-Term Evolution (3GPP LTE) communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate within the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations such as WiFi, Bluetooth, and Zigbee. For the example of FIG. 1, an eNB 104 provides wireless service to user equipment (UE) devices 106, 108, 110 within a geographical service area (licensed service area) 102 using one or more licensed frequency bands.

A cellular communication system is typically required to adhere to a communication standard or specification. The communication specification defines physical channel structure that at least includes a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNB 104 can be any type of communication station or transceiver station or radio head and may be referred to as a base station, eNodeB, fixed station, access point, and other terms. The eNB 104 is typically connected within a network of several other eNBs through a backhaul (not shown in FIG. 1). The UE devices 106, 108, 110 are any type of user devices and are sometimes referred to by other terms such as, for example, handset, phone, smartphone, mobile device, portable device, and modems. Communication using the licensed band may include downlink transmissions from the eNB to UE devices, uplink communication from UE devices to the eNB, and device-to-device (D2D) communication between two or more UE devices. The bi-directional arrows between the UE devices and the eNB in FIG. 1 represent a connection and/or an association but do not necessarily indicate an ongoing communication session. For example, a UE device may be registered to the eNB and receiving control information but not exchanging data with the eNB.

The licensed communication equipment communicates in the licensed frequency band using a licensed physical channel structure. The physical channel structure for downlink communication may differ from the physical channel structure for uplink communication. The licensed physical channel structure partitions time and frequency to define a plurality of time-frequency resources (resource elements). Sets of resources are allocated for a particular type of communication. For example, different sets of time-frequency communication resources can be allocated for data, control, and reference signals. For the examples herein, the licensed physical channel structure adheres to at least one revision of the 3GPP LTE communication specification.

Other unlicensed devices 112, 114, 116, 118 within the licensed service area 102 use an unlicensed frequency band for communication. The unlicensed devices 112, 114, 116, 118 may include access points (APs) 112 providing service to mobile devices 114 and devices 116, 118 operating in device-to-device communication scenarios. The unlicensed communications may be ad hoc communication scenarios and may be bidirectional or one way. Accordingly, the unlicensed devices 112, 114, 116, 118 may include various types of devices and equipment. For the example of FIG. 1, an access point 112 provides wireless service to mobile devices 114 within an unlicensed service area 120 and two other devices 116, 118 communicate directly with each other using the unlicensed frequency band.

For the examples herein, the licensed equipment 104, 106, 108, 110 uses an unlicensed physical channel structure for communication in the unlicensed frequency band where the unlicensed physical channel structure at least has the same time and frequency divisions as the licensed physical channel structure. Although the frequencies are different, each frequency division in the unlicensed structure corresponds to a frequency division in the licensed structure such that the communication resource elements in the unlicensed structure correlate to the communication resource elements in the licensed structure. A reference set of communication resource elements for transmission of reference signals have the same symbol times as a reference set of resource elements allocated in the licensed physical channel structure for reference signals.

For the examples herein, the licensed equipment 104, 106, 108, 110 uses the unlicensed frequency band for communication at times determined to avoid interference or at least to result in a tolerable level of interface with communication between unlicensed devices and, in some situations, other licensed devices using the unlicensed frequency band. The unlicensed frequency band is monitored prior to transmission to determine if the band is currently in use. If it is determined that the band is not in use, the licensed equipment transmits signals within the unlicensed frequency band. For the example of FIG. 1, dashed arrows indicate transmissions within the unlicensed band by the licensed system equipment. In some scenarios, UE devices 108, 110 transmit signals 122, 124 to the eNB 104 within the unlicensed frequency band. The signals 122, 124 reach the unlicensed devices that are sufficiently close depending on the power level of the signal. For example, the signal 122 from one UE device 122 may reach the access point 112 and the unlicensed mobile device 114 and the signal 124 from second UE device 110 may reach the unlicensed mobile device 116, 118. In another scenario, the eNB 104 transmits a signal 126 within the unlicensed frequency band to one or more UE devices 110 and the signal 126 may reach the unlicensed mobile devices 116, 118. The unlicensed mobile device 118 may be outside of the licensed service area 102 in some situations. Since the unlicensed frequency band is monitored for energy prior to transmission by the UE device 108, interference at the unlicensed devices is reduced. In addition, interference at the licensed devices due to transmission by the unlicensed devices is also reduced.

Figure 2:
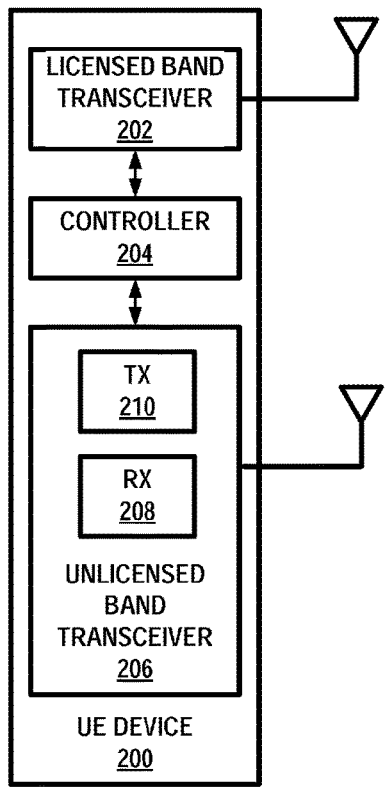
FIG. 2 is a block diagram of an example of a UE device suitable for use as one of the UE devices in FIG. 1.

FIG. 2 is a block diagram of an example of a UE device 200 suitable for use as one of the UE devices 106, 108, 110 in FIG. 1. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may also be used in some situations to transmit a reserve signal in the unlicensed frequency band as discussed below in further detail. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, device-to-device (D2D) control information from another UE, and/or D2D data information from another UE device.

The licensed band transceiver 202 includes a transmitter that transmits uplink wireless signals to eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 208 and other components such as memory.

Figure 3:
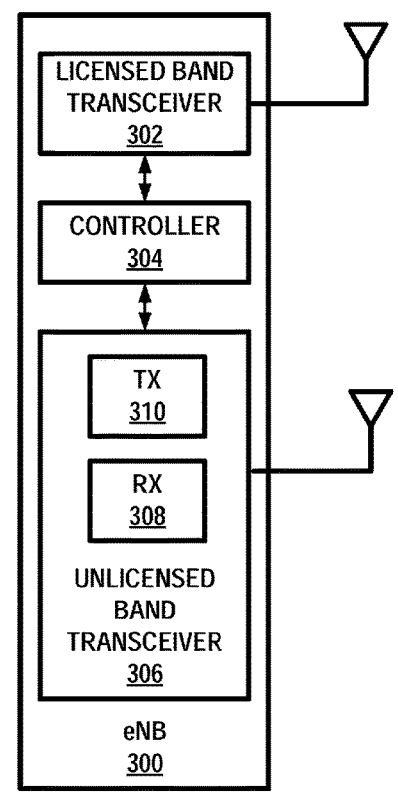
FIG. 3 is a block diagram of an example of an eNB suitable for use as the eNB in FIG. 1.

FIG. 3 is a block diagram of an example of an eNB 300 suitable for use as the eNB 104 in FIG. 1. The eNB 300 includes a licensed band transceiver 302, a controller 304, as well as other components and circuitry (not shown) such as memory, for example. For the examples herein, the eNB also includes an unlicensed band transceiver 306 which includes an unlicensed band receiver 308 and an unlicensed band transmitter 310. The unlicensed band transmitter 310 transmits signals over the unlicensed frequency band where, depending on the situation, the signals may provide downlink control information to the UE device and downlink data information to the UE device. The unlicensed band transmitter 310 may also be used in some situations to transmit a reserve signal in the unlicensed frequency band as discussed below in further detail. The unlicensed band transmitter 310 may be omitted from the eNB 300. This may be the case where the eNB is used to only monitor the unlicensed band and/or only to receive signals within the unlicensed band. The licensed band transceiver 302 exchanges wireless signals with the UE devices 104, 106, 108, 110 within the service area 102. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. As discussed below in further detail, at least one of the timing parameters is applied to the unlicensed frequency band.

FIG. 4 is an illustration of a timing structure 400 that includes at least frames, subframes, timeslots, and symbol times (periods). The illustration of FIG. 4 is a frequency-time graph that shows a relative timing structure that is not necessarily drawn to scale and only provides an exemplary visual representation. The timing structure used by a system is typically at least partially based on the communication specification with which the system operates and on the regulations of the frequency band. Time can be organized in numerous ways to establish the timing structure (timing scheme) of the system. For the examples herein, time is at least organized into frames 402, subframes 404, 406, 408, time slots 412, 414 and symbol times 416.

The frame 402 includes a plurality of subframes including at least a first subframe (K) 404 and a second subframe (K+1) 408. Each subframe is divided into time slots 412, 414. For LTE, each frame includes 10 subframes and each subframe includes 2 time slots. The time slots 412, 414 are further divided into symbol times 416, where for LTE communication specifications, each time slot includes seven symbol times 416. As discussed below in further detail, the frequency band 418 used for communication is divided into subcarriers to form the frequency structure of the physical channel structure where the combination of symbol times and subcarriers defines resource elements.

Figure 5A:
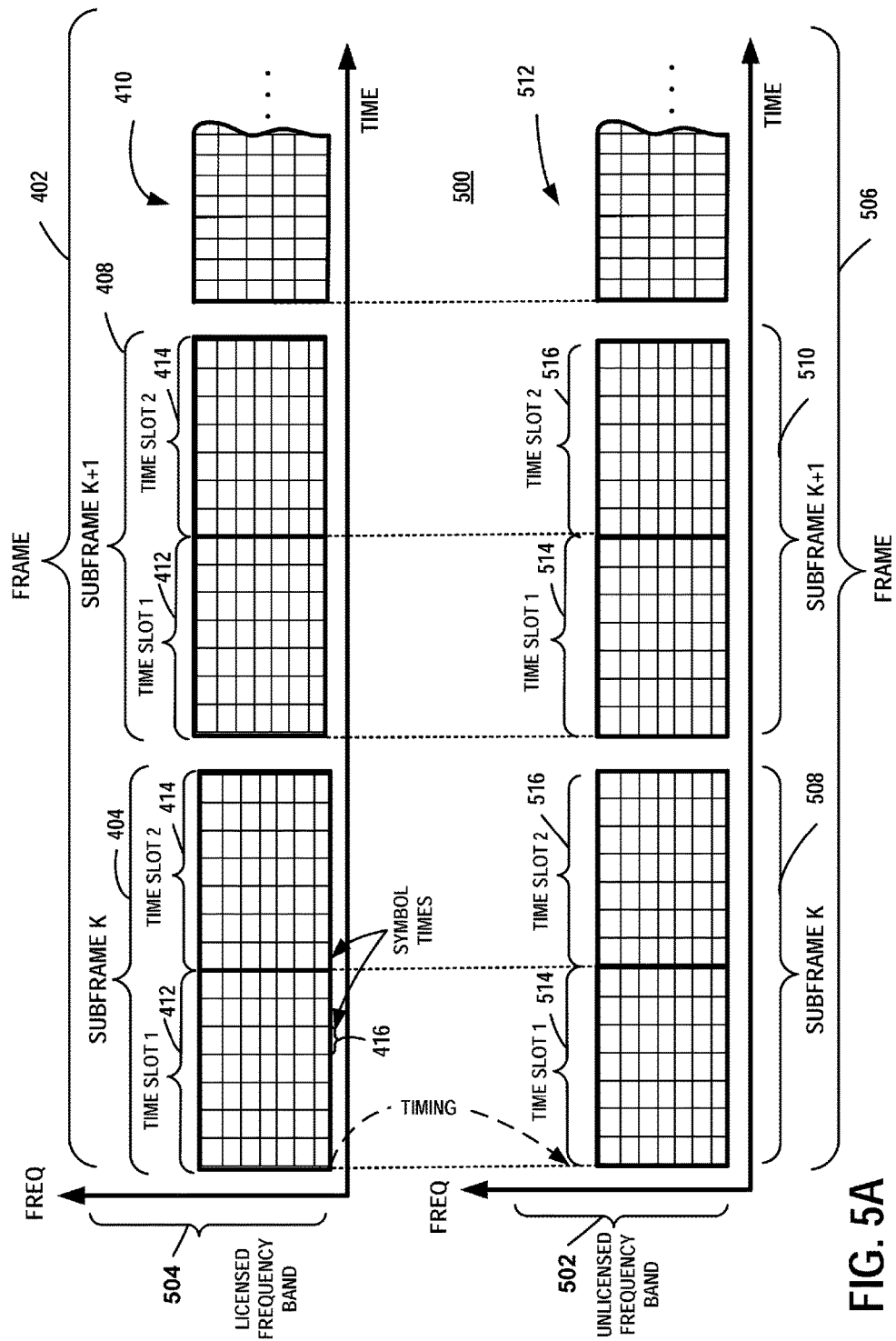
FIG. 5A is an illustration of an unlicensed frequency band and a licensed frequency band where the timing and the timing structure used by a licensed system (licensed equipment) in the licensed frequency band is used for communication in the unlicensed frequency band.
Figure 5B:
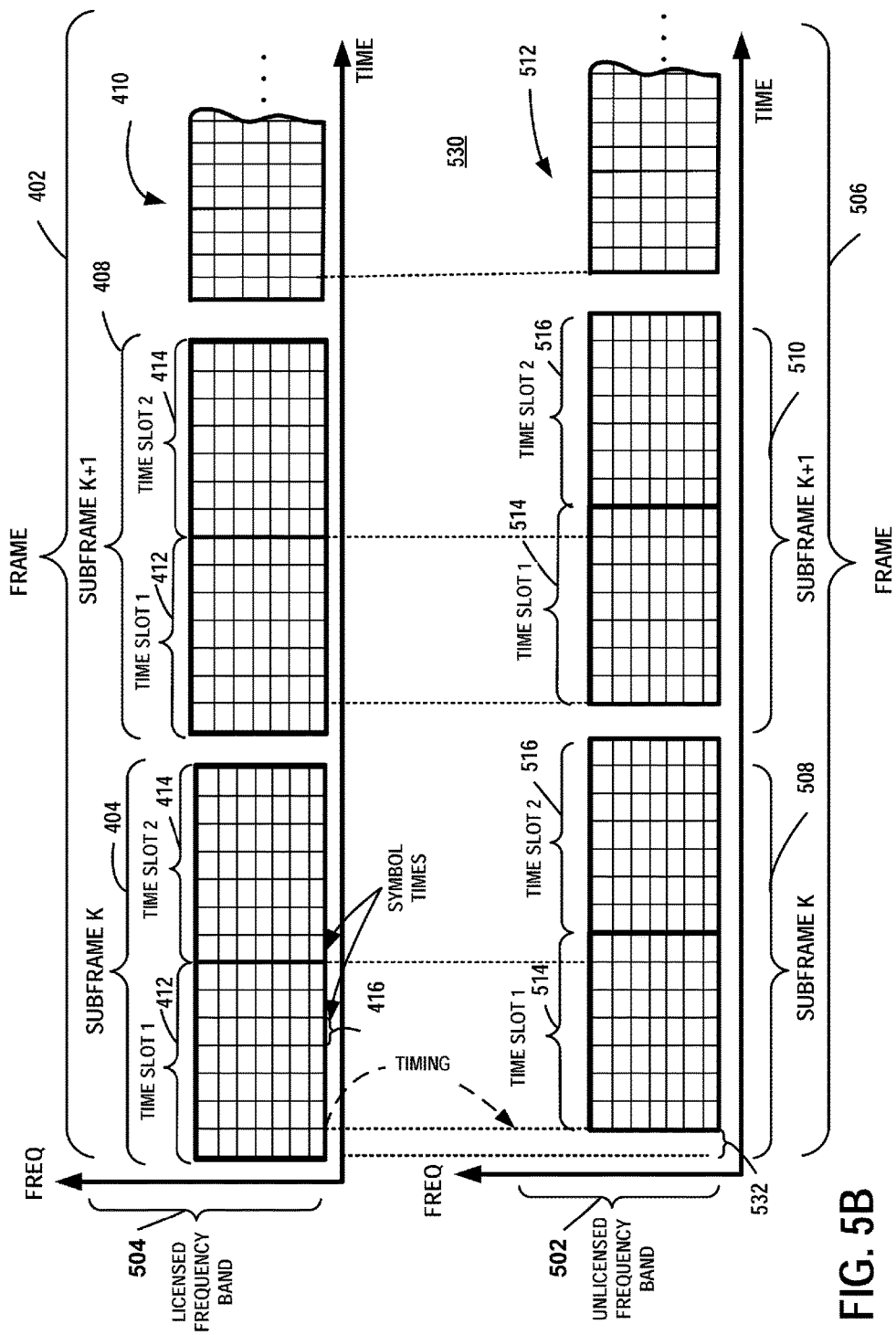
FIG. 5B is an illustration of an unlicensed frequency band and a licensed frequency band where the timing and the timing structure used by a licensed system in the licensed frequency band is used for communication in the unlicensed frequency band and the timing structure in the unlicensed frequency band is offset from the timing structure in the licensed frequency band.

FIG. 5A is an illustration of an unlicensed frequency band 502 and a licensed frequency band 504 where the timing and the timing structure used by a licensed system (licensed equipment) in the licensed frequency band 504 is used for communication in the unlicensed frequency band 502. The illustrations of FIG. 5A and FIG. 5B are frequency-time graphs 500, 530 showing timing structure and timing of the licensed frequency band 502 applied to the unlicensed frequency band 502. The graphs 500, 530 are not necessarily drawn to scale and only provide exemplary visual representations. The timing used by the licensed system in the licensed frequency band is at least partially based on the communication specification with which the system operates and on the regulations of the frequency band. Time can be organized in numerous ways to establish the timing structure (timing scheme) of the system. For the examples herein, time is at least organized into frames 402, subframes 404, 408, 410, time slots 412, 414 and symbol times 416. For the example, the timing and the timing structure used in the licensed frequency band 504 is in accordance with one or more releases of the 3GPP LTE communication specification.

The frame 402 includes a plurality of subframes including at least a first subframe (K) 404 and a second subframe (K+1) 406. As discussed above, each frame includes 10 subframes and each subframe includes 2 time slots for LTE systems. The time slots are further divided into symbol times, where for LTE communication specifications, each time slot includes seven symbol times 416. As discussed below in further detail, the frequency bands 502, 504 are divided into subcarriers to form the frequency structure of the physical channel structure where the combination of symbol times and subcarriers defines resource elements. Other timing schemes and structures can be used in the licensed frequency band 504.

As discussed above, the licensed equipment uses the unlicensed frequency band 502 for communication where a UE device and/or an eNB transmit signals over the unlicensed frequency band 502 in accordance with the timing used in the licensed frequency band 504. The timing structure used in the licensed system is also applied to the unlicensed frequency band. For the example of FIG. 5A, the licensed system applies the frame, subframe, timeslot and symbol time structure to the unlicensed frequency band 502.

For the example, therefore, the licensed equipment transmits signals within the unlicensed frequency band 502 in accordance with the timing and the timing structure used in the licensed frequency band 504. Accordingly, a frame 506 applied in the unlicensed frequency band corresponds to the frame 402 in the licensed frequency band 504. The subframes 508, 510, 512, timeslots 514, 516 and symbol times applied to the unlicensed frequency band correspond to the subframes 404, 408, 410, the timeslots 412, 414, and symbol times 416 in the licensed band, respectively. Although FIG. 5A shows the timing structure of the two bands as aligned, in some situations, the timing structure may be offset by some multiple of symbol times, timeslots, subframes, or other timing structure unit.

FIG. 5B is an illustration of an unlicensed frequency band 502 and a licensed frequency band 504 where the timing and the timing structure used by a licensed system in the licensed frequency band 504 is used for communication in the unlicensed frequency band 502 and the timing structure in the unlicensed frequency band is offset from the timing structure in the licensed frequency band. The timing structure in the unlicensed frequency band has an offset 532 from the timing structure in the licensed band. For the example of FIG. 5B, the offset is one symbol time (symbol period). The offset 532 may be any multiple of symbol times. As shown in FIG. 5B, the edges of symbol times are aligned illustrating that the timing of the licensed band is applied in the unlicensed band.

Figure 6:
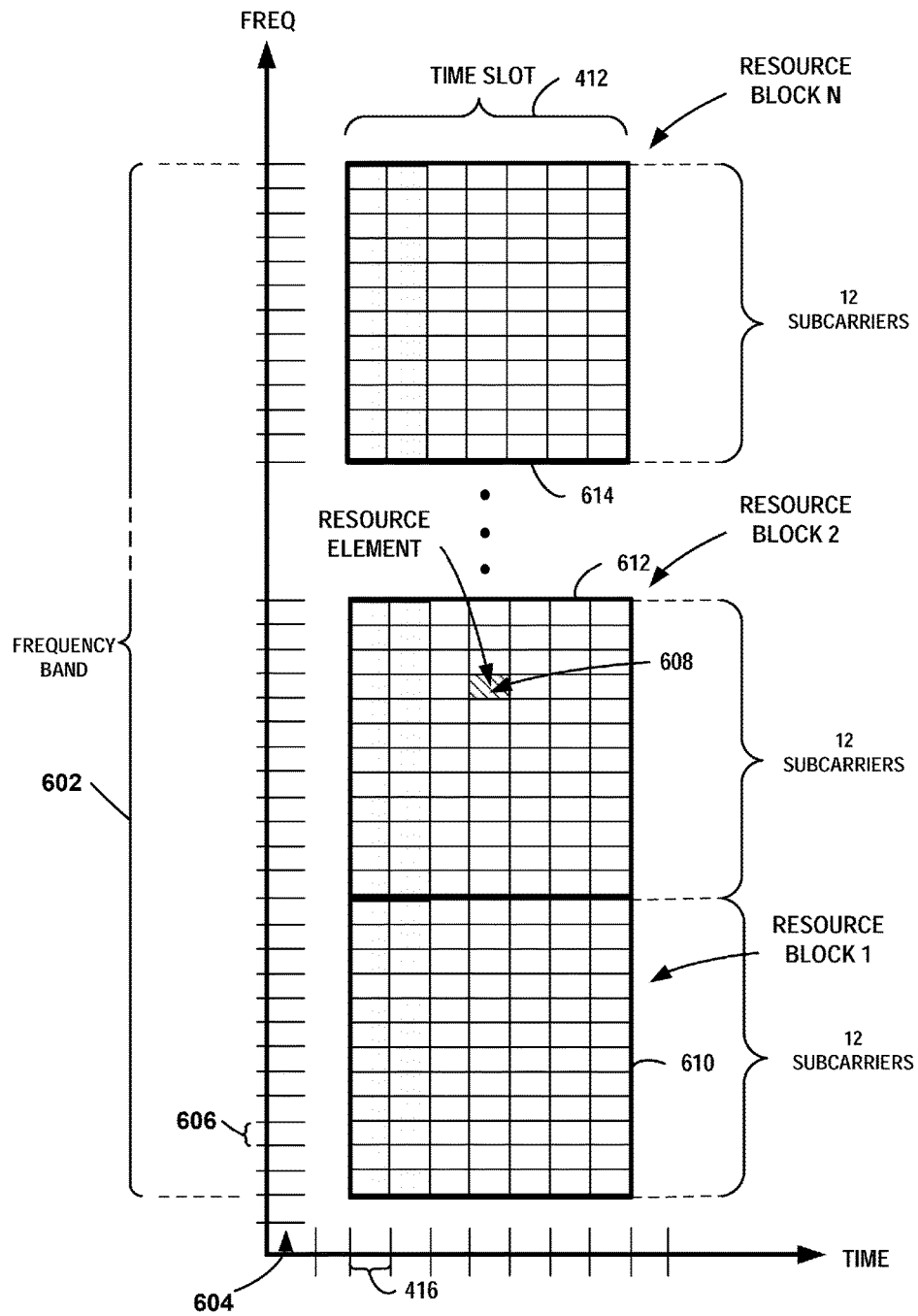
FIG. 6 is a graphical illustration of a frequency structure for a single timeslot within a timing structure.

FIG. 6 is a graphical illustration of a frequency structure for a single timeslot 412 within a timing structure. For the examples herein, the frequency band 602 used for communication is divided into a plurality of equal portions 604 forming subcarriers 606. A resource element 608 is formed by a single symbol time 416 and a single subcarrier 602. For the examples herein, the resource element is the smallest time-frequency communication resource that is allocated for communication. The resource elements 608 are organized into resource blocks where each 12 subcarriers within a timeslot form a resource block 610, 612, 614. Accordingly, the frequency band 602 includes a plurality of resource blocks from resource block 1 610 to resource block N 614. The number (N) of resource blocks within the frequency band 602 typically depends on the bandwidth of the frequency band 602. For example, at least some revisions of the LTE specification provide different number of resource blocks for frequency bands having bandwidths of 1.4, 3, 5, 10, 15, and 20 MHz. In LTE, the downlink frequency band in LTE includes a DC subcarrier that is not transmitted but is counted in the number of subcarriers. For the uplink frequency band, the DC subcarrier does not exist because the entire spectrum is shifted down in frequency by half the subcarrier spacing and is symmetric about zero frequency. Table 1 below provides an example of the allocations of subcarriers and resource blocks for different bandwidths within LTE.

TABLE 1

| Bandwidth | Resource Blocks | Subcarriers (downlink) | Subcarriers (uplink) |
|---|---|---|---|
| 1.4 MHz | 6 | 73 | 72 |
| 3 MHz | 15 | 181 | 180 |
| 5 MHz | 25 | 301 | 300 |
| 10 MHz | 50 | 601 | 600 |
| 15 MHz | 75 | 901 | 900 |
| 20 MHz | 100 | 1201 | 1200 |

The physical structure of a channel, therefore, results from application of the frequency structure to the timing structure. The physical structure includes different sections allocated for different types of transmissions. Depending on the communication specification and other considerations, the system using the physical structure schedules, assigns, or otherwise uses at least subsets of the allocated sections for specific transmissions.

Figure 7:
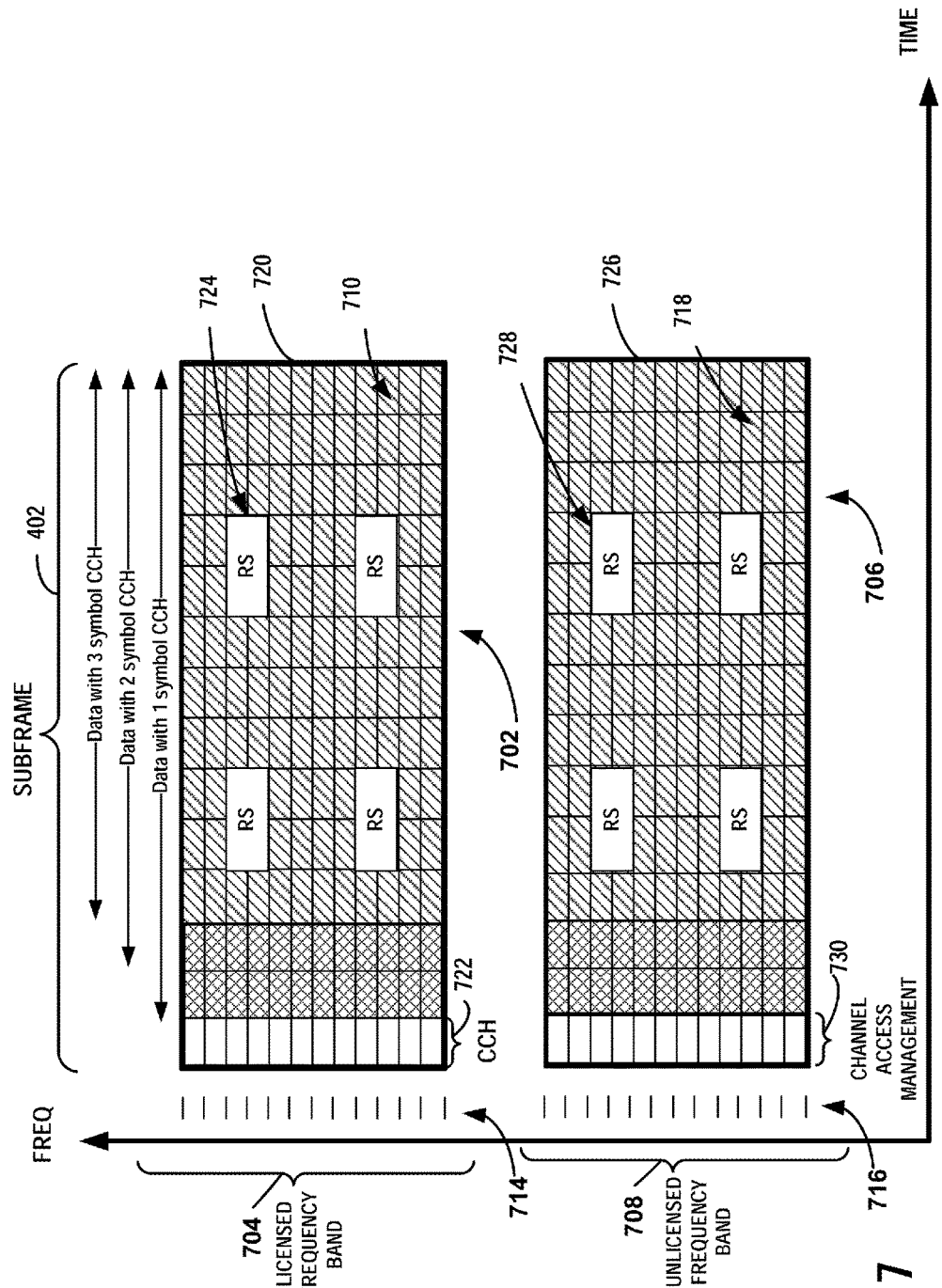
FIG. 7 is a graphical illustration of a subframe of a licensed physical channel structure in the licensed frequency band and a subframe of an unlicensed physical channel structure in the unlicensed frequency band.

FIG. 7 is a graphical illustration of a subframe of a licensed physical channel structure 702 in the licensed frequency band 704 and a subframe of an unlicensed physical channel structure 706 in the unlicensed frequency band 708. As discussed below, the physical channel structures 702, 706 may be used for uplink communication or downlink communication. Accordingly, the transmitting device using the physical channel structure may an eNB or a UE device. Examples of a downlink physical channel structure and an uplink physical channel structure are discussed with reference to FIG. 8 and FIG. 10, respectively. FIG. 7 shows a portion of each physical channel structure since, for the examples herein, the physical channel structures 702, 706 include more than a single subframe and more than 12 subcarriers.

The licensed physical channel structure 702 and the unlicensed physical channel structure 706 divide the frequency resource and the time resource to form a plurality of time-frequency communication resources (resource elements) 710, 712 that may be referred to as communication elements, communication resource elements and other terms. As discussed above, the physical channel structures include a timing structure that divides time into frames, subframes, time slots and symbol times and a frequency structure that divides the frequency band into subcarriers. The licensed frequency band 704, therefore, is divided into a plurality of subcarriers 714. The number of subcarriers in a frequency band may depend on the channel bandwidth and may be organized in groups. For example, as discussed above, the 3GPP LTE communication specification specifies 12 subcarriers in a resource block where the number of resource blocks depends on the channel bandwidth. Although the uplink is SC-FDMA in LTE, the frequency can be considered to be divided into subcarriers because Discrete Fourier Transform pre-coding is used in the uplink. Accordingly, the representation in FIG. 7 applies generally to uplink communication in accordance with LTE.

For the examples herein, the unlicensed frequency band 708 is divided into a plurality of subcarriers 716 that is equal to the number of subcarriers 714 in the licensed physical channel structure 702. Since the timing structure is the same in the unlicensed frequency band as in the licensed frequency band, the number of resource elements 718 in the unlicensed physical channel structure is the same as in the licensed physical channel structure. The plurality of time-frequency communication resources (resource elements) 710 in the licensed band 704 are allocated for different types of information in the subframe of the licensed physical channel structure 702. For the example of FIG. 7, a data set of resources 720 is allocated for data, a control set of resources 722 is allocated for control information, and a reference set of resources 724 is allocated for reference signals. Other sets may be allocated for other types of information. The sets of resources may overlap is some situations in order to allow for flexibility during operation. For example, the data set of resources 720 and the control set of resources 722 may include some common resources. For the example of FIG. 7, the data set of resources 720 is illustrated with double cross-hatching for resources that may be used for control or for data and single cross-hatching for resources that are exclusively used for data. Such a system is consistent with LTE, where a control channel such a physical downlink control channel (PDCCH) includes at least a single symbol time and may include 2, 3, and in some cases, 4 symbol times. During communication, a transmitting device transmits signals using the appropriate sets of resources by selecting a subset of resources for the transmission. Typically, a scheduler schedules (assigns) subsets of resources of the resource sets of the physical channel structure for communication. The scheduler may assign specific resources to specific devices and/or specific transmissions. Accordingly, the physical channel structure provides an allocation of resources that can potentially be used for communication where the actual resources used in a particular transmission can be less than all of the resources allocated by the physical channel structure.

The unlicensed physical channel structure 706 includes at least some features that are the same as the licensed physical channel structure 702. For the examples herein, the unlicensed physical channel structure includes at least a data set of resources 726 and a reference set of resources 728 for reference signals. As discussed below, the licensed and unlicensed physical channel structures may include other common sets of resources. A set of resources in the unlicensed physical channel structure that corresponds to a set of resources in the licensed physical channel structure occupies the same symbol times (periods) in the unlicensed structure as in the licensed structure. Although the frequencies for an unlicensed set of resources are different from the corresponding set of licensed set of resources, the relative positions within the structures are the same. For example, a reference set in the licensed physical channel structure occupies subcarriers 3, 4, 10 and 11 and the reference set in the unlicensed physical channel structure also occupies subcarriers 3, 4, 10 and 11. In some examples discussed below, the unlicensed physical channel structure includes sets of resources used in an uplink licensed physical channel structure and the transmitting device is a user equipment (UE) device. In other examples, the unlicensed physical channel structure includes sets of resources used in a downlink licensed physical channel structure and the transmitting device is an eNB.

The unlicensed physical channel structure 706 also includes resources reserved for channel access management 730. The channel access management resources allow for channel monitoring and a back-off period sometimes referred to as a sensing/back-off period. Typically, equipment operating in an unlicensed frequency band, such as an 802.11 band, must adhere to regulations and/or communication standards. These regulation or standards often utilize carrier sense multiple access (CSMA) where a transmitting device is required to "listen before talk". Unlicensed systems may also employ collision avoidance techniques. Accordingly, the channel access management resources 730 provide the resources for employing channel access. The channel access management resources 730 occupy at least the first symbol period in the subframe. In some situations, however, the channel access management resources in the unlicensed physical channel structure may occupy more than the first symbol time. In LTE, the first symbol period, the first two symbol periods or the first three symbol periods of a subframe in the licensed physical channel structure are allocated for control information. In some situations, the first four symbol periods are used. The LTE downlink includes a physical downlink control channel (PDCCH) and the uplink includes a physical uplink control channel (PUCCH).

Figure 8:
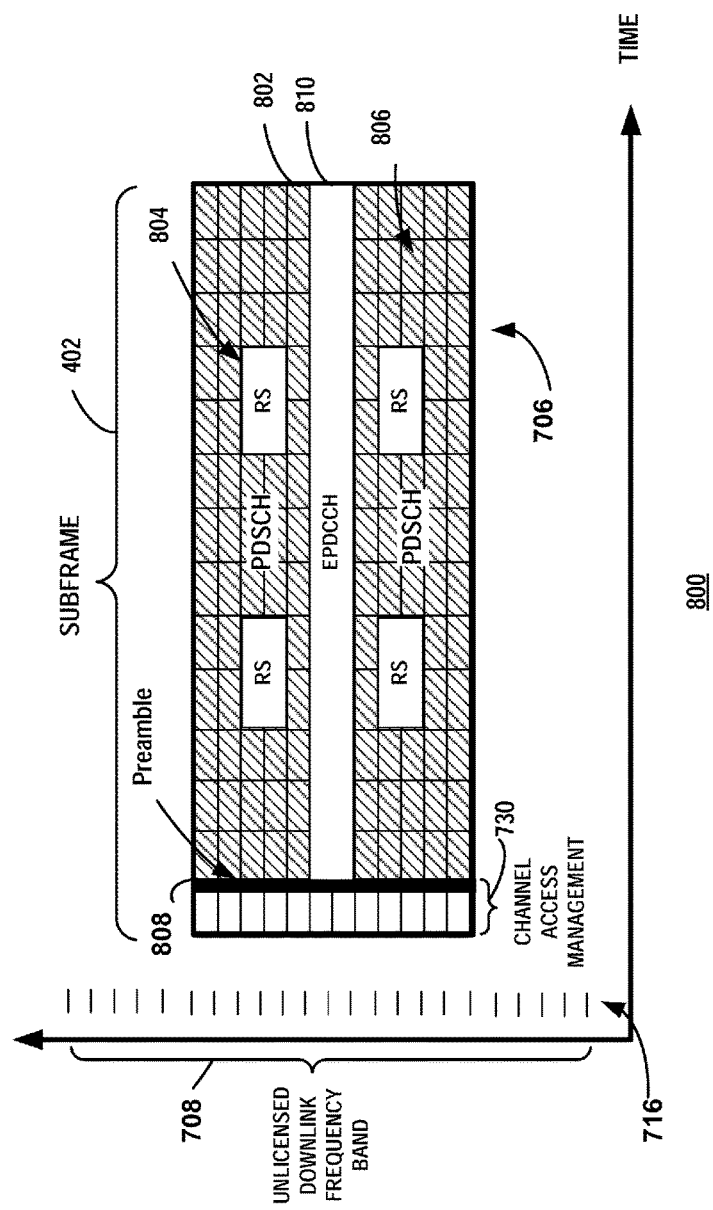
FIG. 8 is a graphical illustration of an example of a portion of an unlicensed downlink physical channel structure.

FIG. 8 is a graphical illustration of an example of a portion of an unlicensed downlink physical channel structure 800. FIG. 8 shows 12 subcarriers for a subframe (i.e. two resource blocks for two timeslots). For the examples herein, the unlicensed downlink physical channel structure 800 includes the same number of frequency divisions 716 and the same time divisions as the licensed downlink physical channel used by the licensed equipment. As discussed below, the unlicensed downlink physical channel structure further includes dividing time into smaller sub-symbol increments. The symbol timing, however, is the same in the unlicensed band as in the licensed band. The unlicensed physical channel structure includes several resource blocks and, therefore, includes more than 12 subcarriers. Only a portion of the physical channel structure, however, is shown in FIG. 8. The number of subcarriers and resource blocks in the unlicensed downlink physical channel structure is the same as the number of subcarriers and resource blocks in the licensed downlink physical channel structure used by the equipment for communication. In addition, at least the downlink data set of resources 802 and the downlink reference set of resources 804 in the unlicensed physical downlink channel structure are the same as the data set of resources and the reference set of resources in the licensed physical downlink channel structure. Therefore, the downlink data set of resources 802 are an example of the data set of resources 726 and the downlink reference set of resources 804 are an example of the reference set of resources 728 when the channel is the downlink channel.

Accordingly, reference signals are transmitted from the eNB within one or more resource elements within the downlink reference set of resources 804. The eNB transmits data within one or more of the resource elements 806 of the downlink data set of resources 802.

The unlicensed downlink physical channel structure 800 includes a channel access management set of resources 730 that occupies at least a portion of resource elements corresponding to the resource elements allocated for the PDCCH in the licensed downlink physical channel structure. During operation, the unlicensed frequency band is monitored during at least a portion of the time allocated for the channel access management resources. Typically, the time for monitoring is less than a symbol period. In one example, the eNB employs a sense and back-off procedure (sense/back-off procedure) where the frequency band is monitored and, if no other devices are determined to be using the band, the eNB waits a back-off period before transmitting. The back-off period is dynamic and may be determined by a formula typically applied by unlicensed equipment in the unlicensed band.

For the examples herein, the monitoring, or sensing, of the unlicensed frequency band is performed in accordance with techniques used by the unlicensed equipment using the unlicensed frequency band. For example, if the unlicensed frequency band is the 2.4 GHz band typically used by systems adhering to 802.11 standards, the monitoring is performed by the transmitting device using techniques similar to the techniques used by 802.11 devices. Any of various techniques, however, may be used to "sense", "listen to" or otherwise monitor the unlicensed frequency band. The transmitting devices include electronics for measuring the energy within the unlicensed frequency band and comparing the measured energy to a threshold. If the measured energy exceeds the threshold, the transmitting device determines that the band is in use. In some situations, the energy within the entire unlicensed frequency band is measured. In other situations, only a portion of the spectrum of the unlicensed frequency band is measured. For example, if the transmitting device is determining whether other licensed devices are using the unlicensed frequency band, the transmitting device may look at specific subcarriers where energy will be present if a licensed device is using the frequency band. Such subcarriers may be used for transmitting reference signals, for example.

In some situations, a preamble 808 may be used to reserve the unlicensed frequency band for transmission from the eNB. The transmission of the preamble occupies the channel such that other devices attempting to use the channel detect the preamble and refrain from transmitting. The preamble may be random data or may include information depending on the particular implementation. Therefore, for some situations, the eNB senses the unlicensed downlink frequency band to determine the band is not use by other devices, refrains from transmitting for a dynamically determined time period, and, if the band is still not in use, transmits a preamble for the remained of the first symbol period.

For the examples described below, control information is transmitted over a control channel in the licensed frequency band and data is transmitted over the unlicensed frequency band. In circumstances where control information is transmitted within the unlicensed band, the unlicensed downlink physical channel structure includes a control set of resource elements that can be used for transmission of control information. For example, an optional enhanced physical downlink control channel (EPDCCH) 810 may be included in the unlicensed downlink physical channel structure where the resource elements allocated for the channel 810 correlate to the resources used for the EPDCCH in the licensed downlink physical channel structure.

Figure 9:
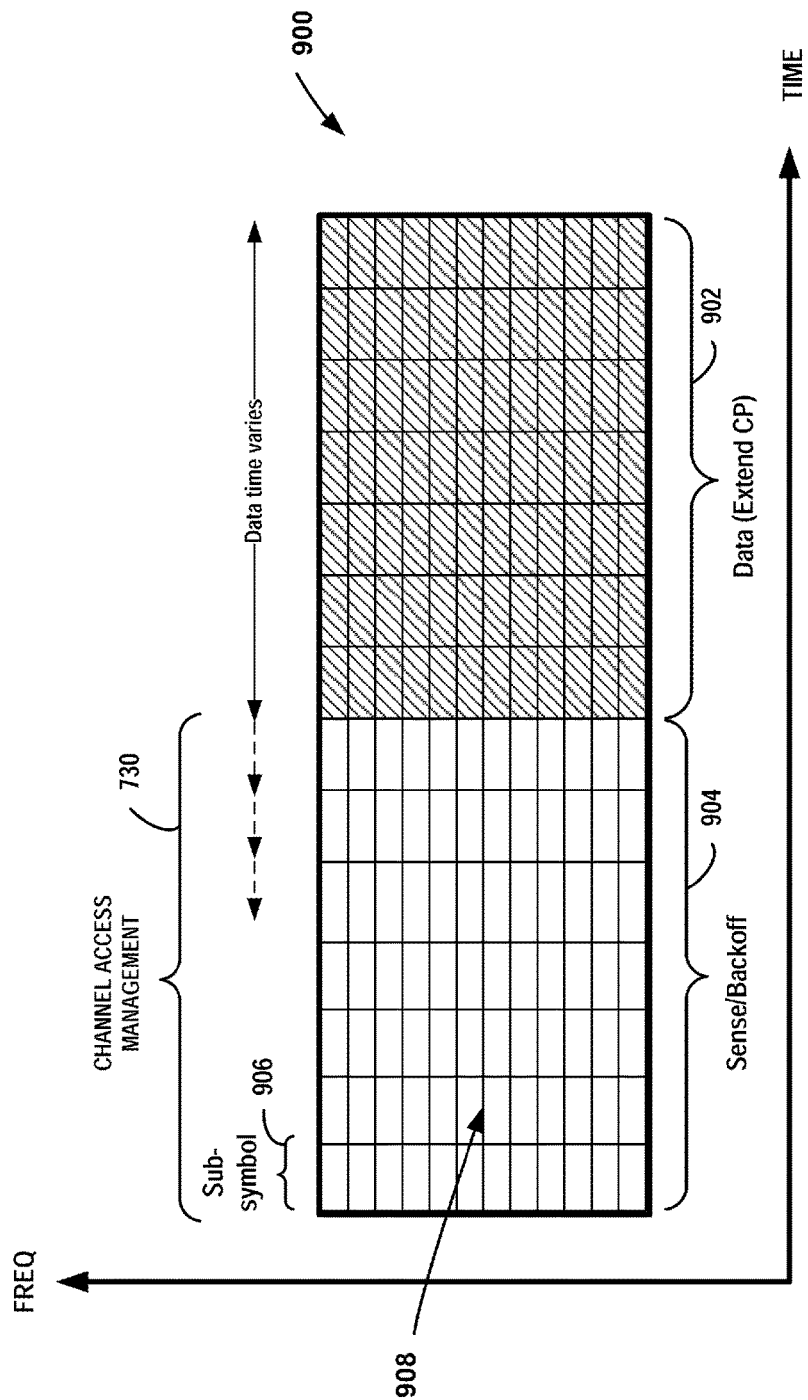
FIG. 9 is an illustration of the first symbol of the unlicensed downlink physical channel structure for an example where the first symbol includes data after the sense/back-off period.

FIG. 9 is an illustration of the first symbol 900 of the unlicensed downlink physical channel structure 800 for an example where the first symbol 900 includes data 902 after the sense/back-off period 904. For the example discussed with reference to FIG. 9, time is further divided into sub-symbols 906 such that at least the first symbol of each the first time lot is includes a plurality of sub-symbols 906. Although the sub-symbols 906 may have any duration, in most situations, the periods of the sub-symbols are equal. An example of a suitable sub-symbol is on the order of 2.5 microseconds. The channel access management resources 730 include the sense/back-off resources 908 where the eNB senses the channel and waits a back-off period. The back-off period is dynamically determined and may be based on techniques used by the unlicensed communication equipment in the unlicensed frequency band. After the back-off period, data is transmitted for the remainder of the symbol. In one example, the cyclic prefix (CP) of a first symbol of data to be transmitted is extended such that a portion of the CP is transmitted within the data resources 902 of the first symbol period 900 and the remaining portion of the CP is transmitted within the second symbol period.

Figure 10:
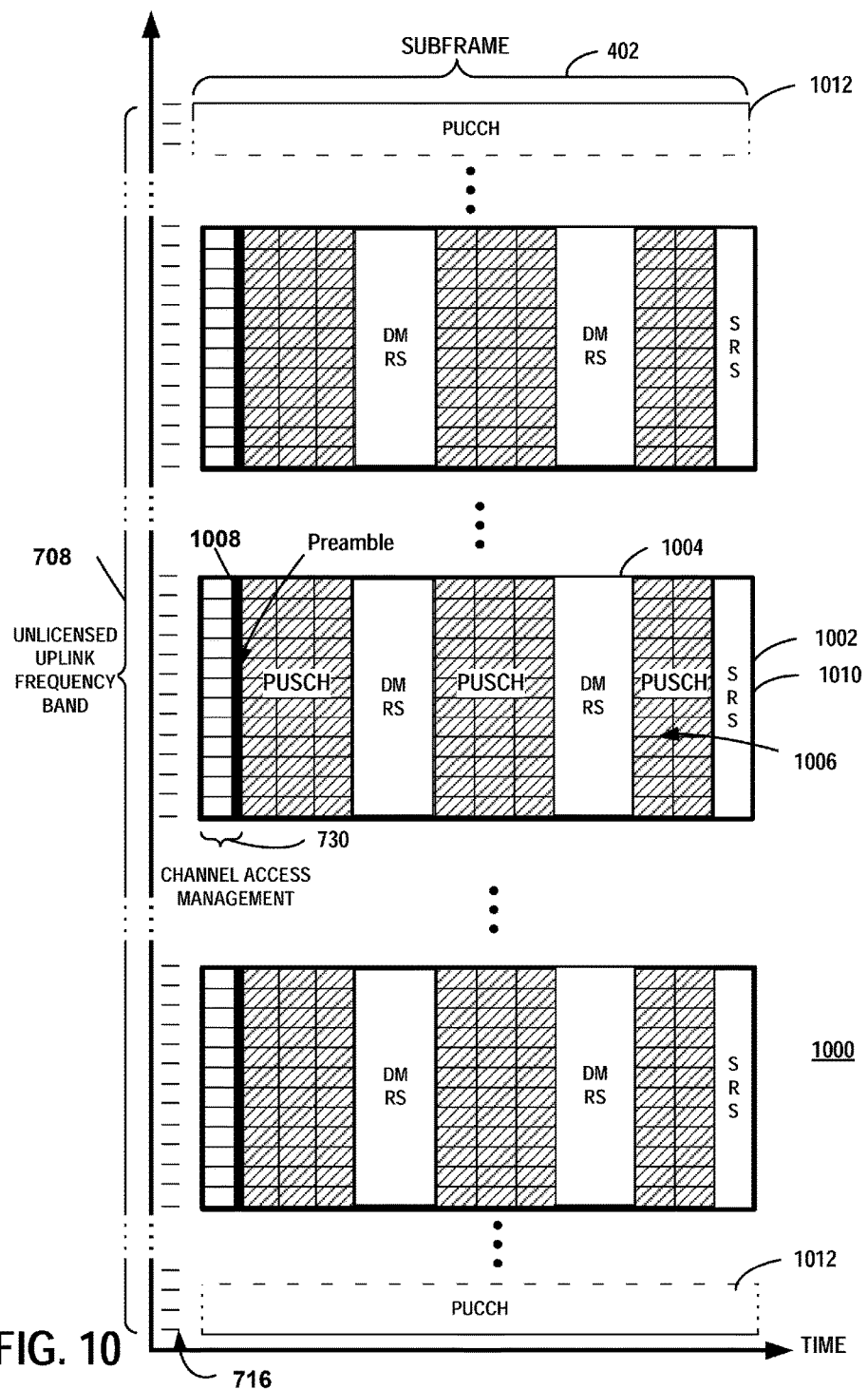
FIG. 10 is a graphical illustration of a portion of an example an unlicensed uplink physical channel structure.

FIG. 10 is a graphical illustration of an example of a portion of an unlicensed uplink physical channel structure 1000. FIG. 10 shows three sets of 12 subcarriers for a subframe. For the examples herein, the unlicensed uplink physical channel structure 1000 includes the same number of frequency divisions 716 and the same time divisions as the licensed uplink physical channel used by the licensed equipment. Similarly to the unlicensed downlink physical channel structure, the unlicensed uplink physical channel further includes dividing time into smaller sub-symbol increments. The symbol timing, however, is the same in the unlicensed band as in the licensed band. The unlicensed physical uplink channel structure includes several resource blocks. The number of subcarriers and resource blocks in the unlicensed uplink physical channel structure is the same as the number of subcarriers and resource blocks in the licensed uplink physical channel structure used by the equipment for communication. In addition, at least the uplink data set of resources 1002 and the uplink reference set of resources 1004 in the unlicensed physical uplink channel structure are the same as the data set of resources and the reference set of resources in the licensed uplink physical channel structure. The uplink reference set of resources are for transmission of demodulation reference signals (DMRS) in the examples. DMRS is used for channel estimation and for coherent demodulation for the PUSCH and PUCCH.

Accordingly, DMRS reference signals are transmitted from a UE device within one or more resource elements within the reference set of resources 1004. The UE device transmits data within one or more of the resource elements 1006 of the data set of resources 1002. The resources elements are typically scheduled by a scheduler.

The unlicensed uplink physical channel structure 1000 includes a channel access management set of resources 730 that occupies at least a portion of resource elements corresponding to the resource elements allocated for the PUCCH in the licensed uplink physical channel structure. During operation, the unlicensed frequency band is monitored during at least a portion of the time allocated for the channel access management resources. Typically, the time for monitoring is less than a symbol period. In one example, the UE device employs a sense and back-off procedure (sense/back-off procedure) where the frequency band is monitored and, if no other devices are determined to be using the band, the UE waits a back-off period before transmitting. The back-off period is dynamic and may be determined by a formula typically applied by unlicensed equipment in the unlicensed band. As discussed above, the monitoring, or sensing, of the unlicensed frequency band is performed in accordance with techniques used by the unlicensed equipment using the unlicensed frequency band.

In some situations, a preamble 1008 may be used to reserve the unlicensed frequency band for transmission from the UE device. The transmission of the preamble occupies the channel such that other devices attempting to use the channel detect the preamble and refrain from transmitting. The preamble may be random data or may include information depending on the particular implementation. Therefore, for some situations, the UE device senses the unlicensed downlink frequency band to determine the band is not use by other devices, refrains from transmitting for a dynamically determined time period, and, if the band is still not in use, transmits a preamble for the remained of the first symbol period.

In some situations, the unlicensed physical uplink channel structure 1000 includes an SRS set of resources 1010. In licensed systems such as systems operating in accordance with LTE, sounding reference signals (SRS) can be transmitted in the uplink to facilitate a determination by the eNodeB uplink channel quality for subsections of frequency regions. SRS are optional in LTE systems. The same techniques can be applied in the unlicensed band by including the SRS set of resources 1010.

For the examples described below with reference to FIG. 11 and FIG. 12, control information is transmitted over a control channel in the licensed frequency band and data is transmitted over the unlicensed frequency band. In circumstances where control information is transmitted within the unlicensed band, the unlicensed uplink physical channel structure includes a control set of resource elements that can be used for transmission of uplink control information. For example, an optional physical uplink control channel (PUCCH) 1012 may be included in the unlicensed downlink physical channel structure where the resource elements allocated for the channel 1012 correlate to the resources used for the PUCCH in the licensed uplink physical channel structure. Typically, the resources allocated for PUCCH in LTE systems are at the frequency band edges. The unlicensed set of uplink control resources (PUCCH) 1012 correlate to the resources used for the PUCCH in the licensed uplink physical channel structure.

Figure 11:
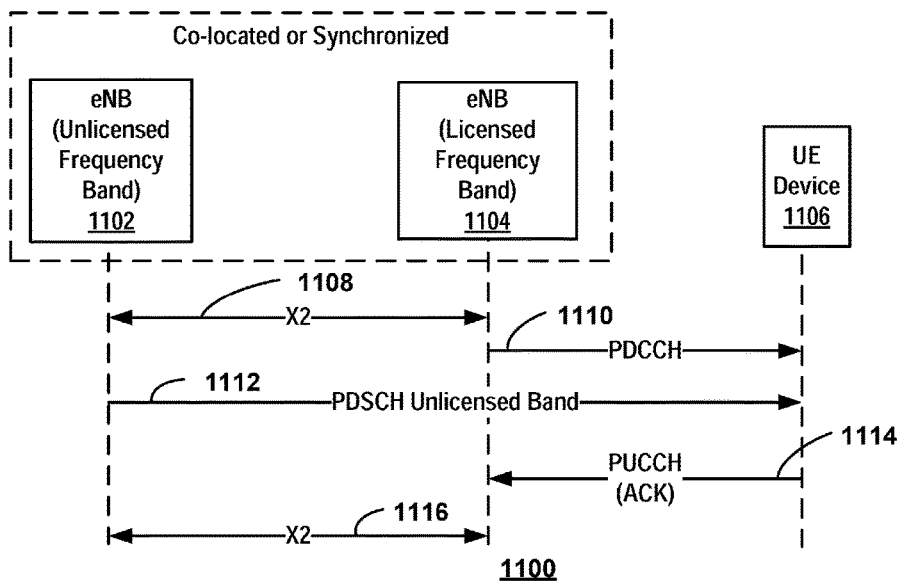
FIG. 11 is a message diagram for an example where licensed equipment transmits data over the unlicensed frequency band using the unlicensed downlink physical channel structure.

FIG. 11 is a message diagram for an example where licensed equipment transmits data over the unlicensed frequency band using the unlicensed downlink physical channel structure. For the example of FIG. 11, the eNB 1102 using the unlicensed frequency band is either synchronized with the eNB 1104 using the licensed frequency band or is the same eNB. The equipment providing the licensed cell to the UE device 1106, therefore, is the same equipment providing the unlicensed cell for the UE device 1006 or communicates with the equipment providing the unlicensed cell. The unlicensed eNB 1002 communicates with the licensed eNB using an X2 communication link 1108. Other types of backhaul can be used. For example, an Internet connection can be used between the two eNBs. The eNBs can coordinate frequency allocations over the communication link. At event 1110, the licensed eNB sends a message over the PDCCH in the licensed frequency band to the UE device 1106. The PDCCH message at least includes an indication or identification of the communication resources that will be used in the PDSCH of the unlicensed downlink physical channel structure to transmit data in the unlicensed frequency ban d to the UE device 1006. At event 1112, the unlicensed eNB transmits data within the PDSCH of the unlicensed downlink physical channel structure to the UE device 1006. At event 114, the UE device 1006 responds to the PDSCH message with an acknowledgment in the PUCCH within the licensed uplink physical channel structure. At event 1116, the acknowledgment is relayed from the licensed eNB 1004 to the unlicensed eNB 1102 over the backhaul.

Figure 12:
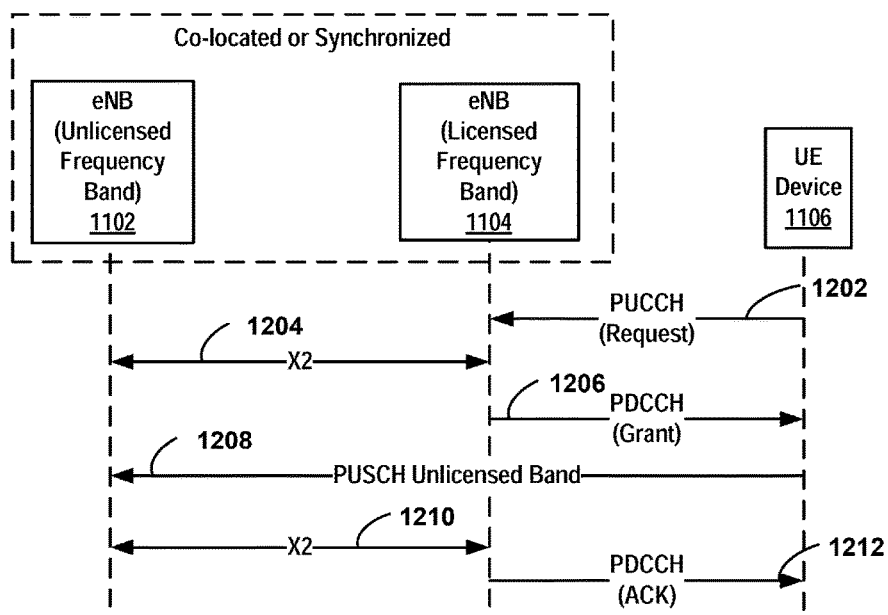
FIG. 12 is a message diagram for an example where the licensed equipment transmits data over the unlicensed frequency band using the unlicensed uplink physical channel structure.

FIG. 12 is a message diagram for an example where the licensed equipment transmits data over the unlicensed frequency band using the unlicensed uplink physical channel structure. For the example of FIG. 12, the eNB 1102 using the unlicensed frequency band is either synchronized with the eNB 1104 using the licensed frequency band or is the same eNB. The equipment providing the licensed cell to the UE device 1106, therefore, is the same equipment providing the unlicensed cell for the UE device 1006 or communicates with the equipment providing the unlicensed cell. At event 1201, the UE device 1106 sends a request to the licensed eNB over licensed frequency using the PUCCH in the licensed uplink physical channel structure. The licensed eNB 1004 communicates the request to the unlicensed eNB using an X2 communication link 1108. Other types of backhaul can be used. For example, an Internet connection can be used between the two eNBs. The unlicensed eNB 1102 identifies to the licensed eNB 1104 the PUSCH resources that are allocated to the UE device and the licensed eNB transmits a grant message 1206 in the PDCCH of the licensed downlink physical channel structure. The grant message PDCCH 1206 identifies resources within the PUSCH of the unlicensed uplink physical channel structure that are allocated for data transmission by the UE device 1106. At event 1208, the UE device 1106 uses scheduled (assigned) resources to transmit data to the unlicensed eNB 1102 over the unlicensed frequency band. At event 1210, the unlicensed eNB provides, over the backhaul, to the licensed eNB 1104 information indicating an acknowledgement. In response, the licensed eNB 1104 transmits a PUCCH acknowledgement to the UE device 1106 at event 1212.

Figure 13:
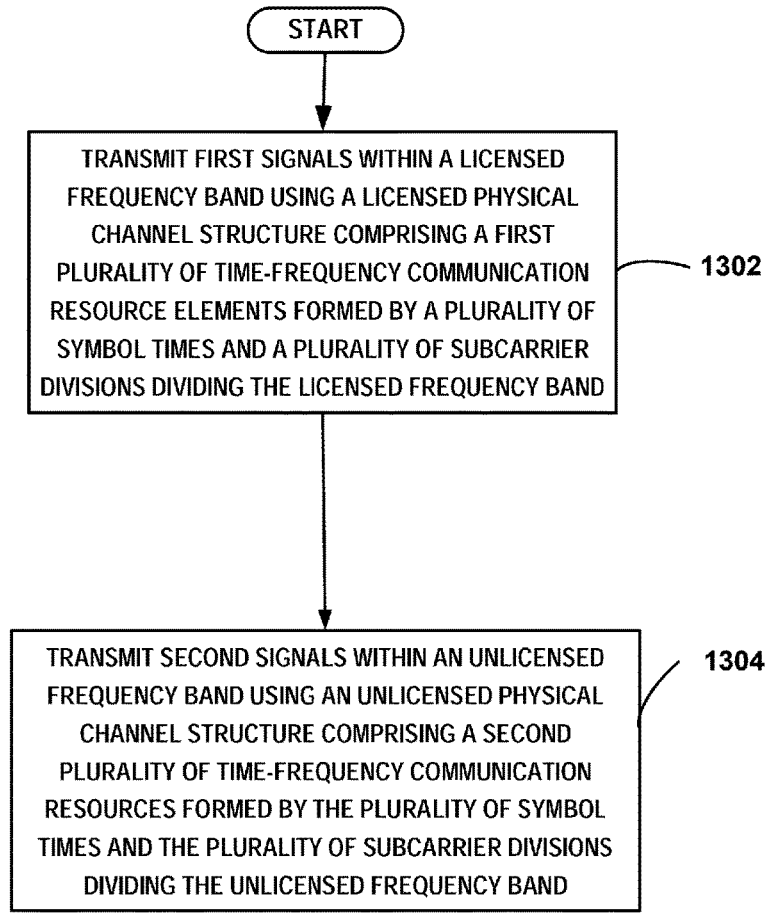
FIG. 13 is a flow chart of a method of communication that is performed in either an eNB or a UE device.

FIG. 13 is a flow chart of a method of communication that is performed in either an eNB or a UE device. The order of the steps can be reversed in some situations.

At step 1302, the communication equipment (eNB or UE device) transmits first signals within a licensed frequency band using a licensed physical channel structure comprising a first plurality of time-frequency communication resource elements formed by a plurality of symbol times and a plurality of subcarrier divisions dividing the licensed frequency band. In most situations the eNB or UE device is communicating with other licensed equipment and, therefore, is exchanging (transmitting and receiving) signals with another eNB or UE device. Examples of the physical structure of the uplink and downlink signals in the licensed band are discussed above.

At step 1304, the communication equipment (eNB or UE device) transmits second signals within an unlicensed frequency band using an unlicensed physical channel structure comprising a second plurality of time-frequency communication resources formed by the plurality of symbol times and the plurality of subcarrier divisions dividing the unlicensed frequency band. Therefore, after communicating in the licensed frequency band, the eNB or UE device communicates with the unlicensed frequency band. Examples of the physical structure of the uplink and downlink signals in the unlicensed band are discussed above.

In some circumstances, the licensed physical channel structure includes a reference signal set of time-frequency communication blocks allocated for transmission of reference signals where the unlicensed physical channel structure also includes reference signal set of time-frequency communication blocks allocated for transmission of reference signals where the reference signal set of the unlicensed physical channel structure has the same symbol times as the reference signal set in the licensed physical channel structure. The particular subcarrier references used for the two reference signal sets are the same although the frequencies of the subcarriers are different since they are in different frequency bands.

Further, in some circumstances, the licensed physical channel structure includes a data signal set of time-frequency communication blocks allocated for transmission of data and the unlicensed physical channel structure includes a second data signal set of time-frequency communication resources allocated for transmission of data. The data signal set of the unlicensed physical channel structure has the same symbol times as the data signal set in the licensed physical channel structure. The particular subcarrier references used for the two reference signal sets are the same although the frequencies of the subcarriers are different since they are in different frequency bands.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   transmitting, from a communication equipment, first signals within a licensed frequency band using a licensed physical channel structure comprising a first plurality of time-frequency communication resource elements formed by a plurality of symbol times and a plurality of subcarrier divisions dividing the licensed frequency band; and
   transmitting, from the communication equipment, second signals within an unlicensed frequency band using an unlicensed physical channel structure comprising a second plurality of time-frequency communication resource elements formed by the plurality of symbol times and the plurality of subcarrier divisions dividing the unlicensed frequency band.

2. The method of claim 1, wherein:
   the licensed physical channel structure comprises a first reference signal set of time-frequency communication blocks allocated for transmission of reference signals and a first data signal set of time-frequency communication blocks allocated for transmission of data; and
   the unlicensed physical channel structure comprises a second reference signal set of time-frequency communication blocks allocated for transmission of reference signals and a second data signal set of time-frequency communication resources allocated for transmission of data, the second reference signal set and the first reference signal set having same symbol times, the second data signal set and the first data signal set having same symbol times.

3. The method of claim 2, wherein transmitting the first signals within the licensed frequency band using the licensed physical channel structure comprises transmitting the first signals over one or more time-frequency communication resource elements of the licensed physical channel structure and wherein transmitting the second signals within the unlicensed frequency band using the unlicensed physical channel structure comprises transmitting the second signals over one or more time-frequency communication resources of the unlicensed physical channel structure, at least one of the one or more time-frequency communication resource elements of the licensed physical channel structure being different from the at least one of the one or more time-frequency communication resource elements of the unlicensed physical channel structure.

4. The method of claim 3, wherein the unlicensed physical channel structure comprises a channel access management set of time-frequency communication resources allocated for monitoring of the unlicensed frequency band, the channel access management set having a duration of at least one symbol time, the method further comprising monitoring the unlicensed frequency band for at least a portion of the duration.

5. The method of claim 4, further comprising:
refraining from transmitting the second signals for a back-off period within the duration.

6. The method of claim 3, the unlicensed physical channel structure further comprises a preamble set of time-frequency communication resources allocated for transmitting a preamble, the preamble set of time-frequency communication resources between the channel access management set of time-frequency communication resources and the second data signal set of time-frequency communication resources.

7. The method of claim 3, wherein the communication equipment is an eNode B (eNB) and the licensed physical channel structure is a downlink physical channel structure adhering to at least one revision of The Third-Generation Partnership Project Long-Term Evolution (3GPP LTE) communication specification.

8. The method of claim 7, wherein the downlink physical channel structure comprises a physical downlink control channel (PDCCH) set of time-frequency communication resources allocated for transmitting downlink control information, the PDCCH set formed with PDCCH symbol times, and
wherein a channel access management set of time-frequency communication resources is formed with least one of the PDCCH symbol times.

9. The method of claim 8, wherein the unlicensed physical channel structure further comprises a control set of time-frequency communication resources allocated for transmitting other downlink control information.

10. The method of claim 3, wherein the communication equipment is a user equipment (UE) device and the licensed physical channel structure is an uplink physical channel structure adhering to at least one revision of The Third-Generation Partnership Project Long-Term Evolution (3GPP LTE) communication specification.

11. The method of claim 10, wherein the uplink physical channel structure comprises a physical uplink control channel (PUCCH) set of time-frequency communication resources allocated for transmitting uplink control information, the PUCCH set formed with PUCCH symbol times, and
wherein a channel access management set of time-frequency communication resources is formed with at least one of the PUCCH symbol times.

12. The method of claim 11, wherein the unlicensed physical channel structure further comprises a control set of time-frequency communication resources allocated for transmitting other uplink control information.

13. The method of claim 10, wherein the unlicensed physical channel structure comprises a Sound Reference Signal (SRS) set of time-frequency communication resources allocated for transmitting SRS.

14. A user equipment (UE) device comprising:
a first transmitter configured to transmit first signals within a licensed frequency band using a licensed physical channel structure comprising a first plurality of time-frequency communication resource elements formed by a plurality of symbol times and a plurality of subcarrier divisions dividing the licensed frequency band; and
a second transmitter configured to transmit second signals within an unlicensed frequency band using an unlicensed physical channel structure comprising a second plurality of time-frequency communication resource elements formed by the plurality of symbol times and the plurality of subcarrier divisions dividing the unlicensed frequency band.

15. The UE device of claim 14, wherein:
the licensed physical channel structure comprises a first reference signal set of time-frequency communication blocks allocated for transmission of reference signals and a first data signal set of time-frequency communication blocks allocated for transmission of data; and
the unlicensed physical channel structure comprises a second reference signal set of time-frequency communication blocks allocated for transmission of reference signals and a second data signal set of time-frequency communication resources allocated for transmission of data, the second reference signal set having the same symbol times as the first reference signal set, the second data signal set having the same symbol times as the first data signal set.

16. The UE device of claim 15, wherein the first transmitter is configured to transmit the first signals within the licensed frequency band using a licensed physical channel structure comprises transmitting the first signals over one or more time-frequency communication resource elements of the licensed physical channel structure and wherein the second transmitter is configured to transmit the second signals within the unlicensed frequency band using the unlicensed physical channel structure comprises transmitting the second signals over one or more time-frequency communication resources of the unlicensed physical channel structure, at least one of the one or more time-frequency communication resource elements of the licensed physical channel structure being different from the at least one of the one or more time-frequency communication resource elements of the unlicensed physical channel structure.

17. The UE device of claim 16, wherein the unlicensed physical channel structure comprises a channel access management set of time-frequency communication resources allocated for monitoring of the unlicensed frequency band, the channel access management set having a duration of at least one symbol time, the method further comprising monitoring the unlicensed frequency band for at least a portion of the duration.

18. An eNB comprising:
a first transmitter configured to transmit first signals within a licensed frequency band using a licensed physical channel structure comprising a first plurality of time-frequency communication resource elements formed by a plurality of symbol times and a plurality of subcarrier divisions dividing the licensed frequency band; and a second transmitter configured to transmit second signals within an unlicensed frequency band using an unlicensed physical channel structure comprising a second plurality of time-frequency communication resource elements formed by the plurality of symbol times and the plurality of subcarrier divisions dividing the unlicensed frequency band.

19. The eNB of claim 18, wherein:
the licensed physical channel structure comprises a first reference signal set of time-frequency communication blocks allocated for transmission of reference signals and a first data signal set of time-frequency communication blocks allocated for transmission of data; and
the unlicensed physical channel structure comprises a second reference signal set of time-frequency communication blocks allocated for transmission of reference signals and a second data signal set of time-frequency communication resources allocated for transmission of data, the second reference signal set having the same symbol times as the first reference signal set, the second data signal set having the same symbol times as the first data signal set.

20. The eNB of claim 19, wherein the first transmitter is configured to transmit the first signals within the licensed frequency band using a licensed physical channel structure comprises transmitting the first signals over one or more time-frequency communication resource elements of the licensed physical channel structure and wherein the second transmitter is configured to transmit the second signals within the unlicensed frequency band using the unlicensed physical channel structure comprises transmitting the second signals over one or more time-frequency communication resources of the unlicensed physical channel structure, at least one of the one or more time-frequency communication resource elements of the licensed physical channel structure being different from the at least one of the one or more time-frequency communication resource elements of the unlicensed physical channel structure.

21. The eNB of claim 20, wherein the unlicensed physical channel structure comprises a channel access management set of time-frequency communication resources allocated for monitoring of the unlicensed frequency band, the channel access management set having a duration of at least one symbol time, the method further comprising monitoring the unlicensed frequency band for at least a portion of the duration.

* * * * *